(12) United States Patent
Ellsworth et al.

(10) Patent No.: US 8,899,654 B2
(45) Date of Patent: Dec. 2, 2014

(54) INGRESS/EGRESS SYSTEM AND METHOD

(71) Applicant: General Electric Company, Schenectady, NY (US)

(72) Inventors: Harold Alan Ellsworth, Erie, PA (US); William Henry Gross, Erie, PA (US); Gail Leroy Detar, Erie, PA (US); Kevin Harmon, Erie, PA (US); William R Miller, Erie, PA (US)

(73) Assignee: General Electric Company, Schenectady, NY (US)

(*) Notice: Subject to any disclaimer, the term of this patent is extended or adjusted under 35 U.S.C. 154(b) by 21 days.

(21) Appl. No.: 13/633,609

(22) Filed: Oct. 2, 2012

(65) Prior Publication Data

US 2013/0082481 A1   Apr. 4, 2013

Related U.S. Application Data

(60) Provisional application No. 61/542,267, filed on Oct. 2, 2011.

(51) Int. Cl.
*B60J 1/00* (2006.01)
*B60J 1/04* (2006.01)
*B61D 25/00* (2006.01)

(52) U.S. Cl.
CPC .. *B60J 1/04* (2013.01); *B61D 25/00* (2013.01)
USPC ...................................... 296/96.21; 296/84.1

(58) Field of Classification Search
USPC ............ 296/146.16, 96.16, 97.7, 96.21, 84.1, 296/190.1
See application file for complete search history.

(56) References Cited

U.S. PATENT DOCUMENTS

| | | | |
|---|---|---|---|
| 1,534,434 A | 4/1925 | Wibebg | |
| 2,345,703 A | 4/1944 | Goebel | |
| 2,353,863 A | 7/1944 | Wikoff | |
| 3,429,086 A * | 2/1969 | Speich | 52/171.2 |
| 4,116,483 A * | 9/1978 | Kramer et al. | 296/190.1 |
| 4,392,669 A * | 7/1983 | Martin, Jr. | 280/775 |
| 5,673,627 A | 10/1997 | Bieber et al. | |
| 6,276,750 B1 * | 8/2001 | Frisch | 296/190.1 |
| 6,561,572 B1 * | 5/2003 | Martin, Jr. | 296/190.1 |
| 2001/0030449 A1 * | 10/2001 | De Paoli | 296/201 |
| 2006/0175866 A1 * | 8/2006 | Dankert et al. | 296/146.16 |
| 2007/0283626 A1 * | 12/2007 | Neto | 49/141 |
| 2011/0084521 A1 * | 4/2011 | Shellenberger et al. | 296/193.08 |
| 2012/0139293 A1 * | 6/2012 | Antonich | 296/187.07 |

* cited by examiner

*Primary Examiner* — Pinel Romain
(74) *Attorney, Agent, or Firm* — GE Global Patent Operation; John A. Kramer

(57) ABSTRACT

Embodiments provide a structure, system, and method for ingress and egress. The structure includes a frame assembly defining at least one frame aperture. A removable panel may be secured to the frame assembly and define at least one removable panel aperture configured to align within the frame aperture. At least one fastener may removably couple the panel to the frame, the fastener extending through a corresponding one of the removable panel aperture and the frame aperture.

19 Claims, 7 Drawing Sheets

INGRESS/EGRESS SYSTEM AND METHOD

CROSS-REFERENCE TO RELATED APPLICATION

This application claims the benefit of U.S. Provisional Application No. 61/542,267, filed Oct. 2, 2011.

TECHNICAL FIELD

Embodiments of the invention relate to a system for ingress and egress, and associated methods.

DISCUSSION OF ART

Emergency exits may have additional requirements associated with their use beyond simply allowing entry and exit. For example, escape hatches may need to withstand environmental conditions, as well as provide an escape function during emergency situations. Furthermore, some windows, such as escape windows on many busses, are designed for easy knock-out or safe breakage in conformance with various regulations. Each existing emergency exit tends to fit a set of requirements for a particular use or application, and it is not practical to simply interchange an emergency exit tailored to one application for use in another application. Accordingly, as regulation and innovation introduce new standards for emergency cab ingress and egress, it may be desirable to have systems and methods for entering and exiting a confined space, such as a vehicular cab, that differ from those that are currently available.

BRIEF DESCRIPTION

An embodiment of the invention relates to an exit structure. The exit structure includes a frame assembly defining at least one frame aperture, and a removable panel that is secured to the frame assembly and defines at least one removable panel aperture configured to align with the frame aperture. The exit structure further includes at least one fastener that removably couples the removable panel to the frame assembly, the fastener extending through a corresponding one of the removable panel aperture and the frame aperture.

In embodiments, a system is provided that includes an exit structure, where the exit structure includes a frame assembly defining at least one frame aperture. A removable panel is secured to the frame assembly and defines at least one removable panel aperture configured to align with the frame aperture. At least one fastener removably couples the removable panel to the frame assembly, the fastener extending through a corresponding one of the removable panel aperture and the frame aperture. Additionally, the system may include at least one of a heater element, a reinforced segment, or modified elements of a vehicle for which the system has been configured for integration therewith. In one embodiment, a retrofit kit is provided for securing the system to a vehicle cab.

In embodiments, a method is provided that includes installing a frame into a vehicle cab aperture designed to house a non-removable windshield, wherein the frame is configured to receive a removable windshield. The removable windshield is installed into the frame, and at least one tamper resistant fastener is fastened to secure the frame to the removable windshield.

In embodiments, a method is provided that includes unfastening at least one tamper resistant fastener from a frame to unfasten a panel. The method further includes removing the panel from the frame, and exiting a confined space through the frame.

DETAILED DESCRIPTION

Embodiments of the invention relate to a system, method, and structure for ingress and egress. The ingress/egress may be for a confined space, such as a vehicle cab, fabricated structure, or building. For ease of illustration, a non-limiting example is provided for an emergency exit for a vehicle cab, such as may be found on a locomotive.

In an accident such as a railroad accident, a crew may need to escape from the cab of a locomotive that has been turned on its side, such that exiting the locomotive through its standard exit is impractical, or in some cases, impossible. Alternatively, if crew is incapacitated during a railroad accident, the first responders may need a means of accessing the interior of the cab so that they can rescue the crew. Moreover, the design of the cab should consider physical security, tamper resistance, visibility, and any potential interface with different systems that are located near the windows of the locomotive cab. Typically, a locomotive cab includes a cab frame. The cab frame is the framework used to support various elements of the locomotive, including but not limited to, the engine, generator, and the traction motors. The cab frame may include one or more apertures. A window frame may be inserted into an aperture of the cab frame. The window frame may be used to secure a window of the cab in place. In embodiments, a number of handles may fasten the window in place within the window frame from the inside, and differently configured fastener heads can be accessed by first responders outside.

As used herein, the term "egress" includes its counterpart "ingress," and the term "exit" is used as a noun and means a structure and the components thereof that allow for ingress and/or egress from a defined space relative to another area (such as the ambient environment). The term "egress operation" means the steps of opening the exit for moving therethrough, unless language or context suggests otherwise.

Figure 1:
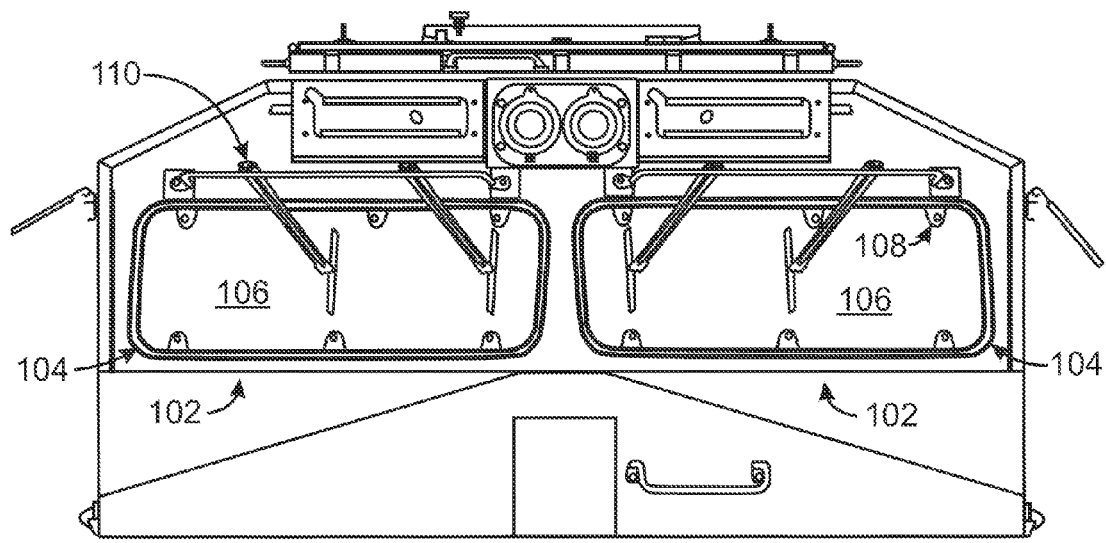
FIG. 1 is a front exterior view of a portion of a locomotive cab in accordance with embodiments of the invention.

FIG. 1 is a front exterior view of a portion of a locomotive cab 100 in accordance with embodiments of the invention. An exit structure 102 is provided that includes a frame assembly 104 and a removable panel 106. The exit structure 102 may be secured to the cab 100 within an aperture of the cab 100. In embodiments, the exit structure 102 may be one of a plurality of identical exit structures 102 affixed to a vehicle or other structure. The plurality of exit structures may include a right handed, left handed, or mirror image exit structures 102. A right handed exit structure includes a removable panel 106 secured to the cab using various securing mechanisms on the right side of the removable panel 106 when viewed from outside of the cab. Similarly, a left handed exit structure includes a removable panel 106 secured to the cab using various securing mechanisms on the left side of the removable panel 106 when viewed from outside of the cab. Mirror image exit structures include at least two or more exit structures, wherein one exit structure includes a removable panel 106 secured to the cab in a manner that mirrors the securing mechanisms of at least one other removable panel 106 when viewed from outside of the cab.

The frame assembly 104 defines at least one frame aperture. In embodiments, the frame aperture is located along the edge of the frame assembly 104. The removable panel 106 also defines at least one removable panel aperture. In embodiments, the removable panel aperture is located along the edge of the removable panel 106. The removable panel 106 can secure to the frame assembly 104 by aligning the removable panel aperture within the frame aperture. One or more fasteners 108 extend through the removable panel aperture and the frame aperture to removably couple the removable panel 106 to the frame assembly 104. FIG. 1 shows twelve fasteners 108. In embodiments, the fasteners 108 may be bolts. Although not displayed in this view, the fasteners 108 may attach to an integral within the cab 100, on the opposite side of the frame and removable panel apertures to the operating handle. The integral may also be referred to as an operating handle. The fasteners 108 and handle may be used to secure the removable panel 106 within the aperture of the frame assembly as described below.

In embodiments, the frame assembly 104 can be installed as an original equipment manufacturer (OEM) installation within the exit structure 102 in the construction of the cab 100. Alternatively, in embodiments, the frame assembly 104 is part of a kit that retroactively fits to the OEM windshield frame of the cab 100 that could otherwise accept a non-removable windshield. The frame assembly 104 may have a gasket or other seal structure to assist the frame assembly 104 in connecting to the removable panel 106. Suitable seal structures can be formed from a foam, such as a neoprene foam or a silicon (or silicone) foam. Other suitable seal structures may include zip strip or tear wire. A seal structure allows for quick separation of the seal structure or gasket for removal of the removable panel 106. In embodiments, the frame assembly 104 may be a window frame that accepts a removable panel 106 that has a flatness deviation of +/−⅛ inch (3.175 mm). As used herein, flatness describes the amount of curvature in a generally flat removable panel.

In embodiments, the removable panel 106 is a windshield or windscreen. Suitable windshields can be simple glass, safety glass, composite glass, laminates, glazed or transparent ceramics, and the like. Further, in embodiments, exit structures include portholes, emergency exits, and the like. When a removable panel is installed in areas other than the viewing area of the locomotive cab, the removable panel may not be transparent or translucent (as the windshield may be). The viewing area is defined as any opening within the cab that allows persons on the interior of the cab see the environment outside of the cab. Thus, fiberglass, polymeric composite, cement, metal and the like may be used throughout the construction of the removable panel when the removable panel is not transparent or translucent. For instances where the removable panel is placed in exit that may be tasked for submersed or semi-submersed activities, and/or severe weather or military service, the material selection process for the removable panel may take into account application specific requirements. That is, non-corrodible materials for use in corrosive environments, heat resistant materials for use in high thermal environments, shock resistant materials in high impact environments, and the like. In this manner, the removable panel may be constructed using any material appropriate for the specific implementation of the removable panel.

In one embodiment, the exit structure 102 may be secured to the locomotive cab 100 having one or more wipers 110. The wipers 110 can be used to clear a path across the exterior of the removable panel 106 when turned on. The wipers 110 allow operators within the cab 100 to have an unobstructed view through the removable panel 106 when environmental conditions outside the cab 100 cause the exterior of removable panel 106 to become obstructed. The fasteners 108 may be disposed at aperture locations on the frame assembly 104 and removable panel 106 so that in operation, the wipers 110 do not impact or contact the fasteners 108.

The position of the wipers 110 on the exterior of the removable panel 106 may be positioned such that removal of the removable panel 106 is not impeded by the wipers 110. For example, the wipers 110 are shown in FIG. 1 atop the removable panel 106. During an egress operation where the crew desires to exit the cab 100 through the exit structure 102 by removing the removable panel 106, the wiper may break away, flex, or simply detach when the removable panel 106 is removed.

Figure 2:
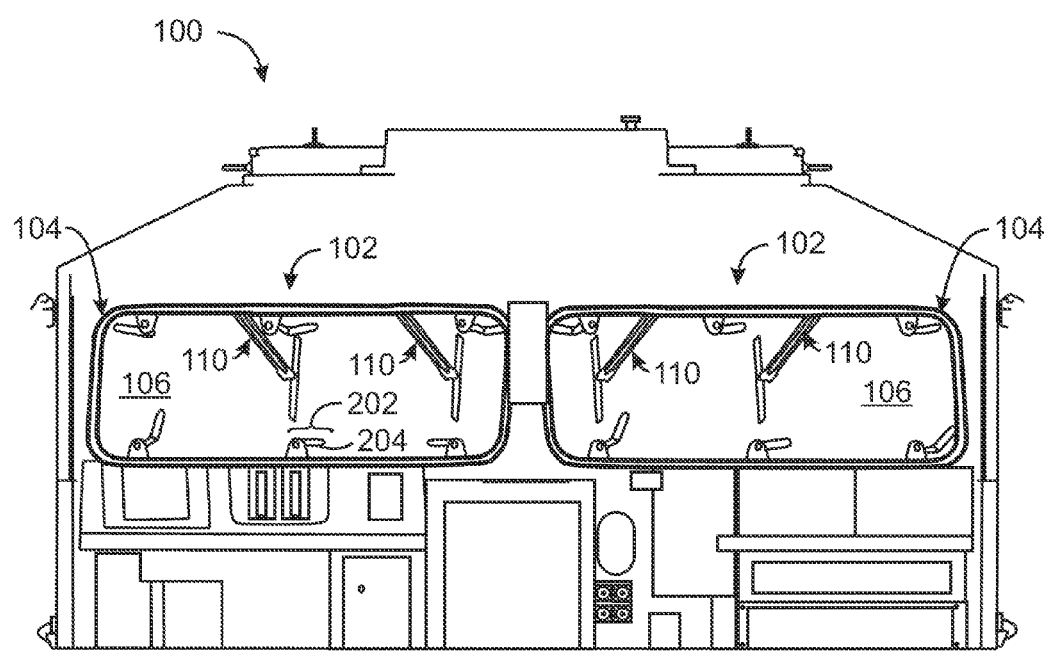
FIG. 2 is a front interior view of a portion of a locomotive cab in accordance with embodiments of the invention.

FIG. 2 is a front interior view 200 of the locomotive cab 100 in accordance with embodiments of the invention. The interior view 200 illustrates the exit structure 102 that includes the frame assembly 104 and the removable panel 106. The wipers 110 are also illustrated in FIG. 2. The interior view also illustrates twelve operating latches 202. The latches 202 may be operated by handles 204. The handles 204 are coupled with the fasteners 108 (FIG. 1) to form the latches 202 that are used to secure the removable panel 106 into the frame assembly 104 within the exit structure 102. In embodiments, the fasteners 108 are bolts that are coupled to the handle 202. The latches 202 may reside inside a confined space, such as the locomotive cab 100. Since the likelihood of tampering from the interior of the cab 100 differs from the likelihood of tampering on the outside of the cab 100, the latches 202 may differ from the heads of the fasteners 108 outside of the locomotive cab 100. For example, break in attempts generally occur from the exterior of the cab 100. As a result, the fasteners 108 on the exterior of cab 100 provide more tamper resistance when compared to the handle 202, given that the fasteners 108 may require the use of a tool to release the removable panel 106. The handle 202 may release the removable panel 106 without the need for any additional tool. In embodiments, the latches 202 may open by swinging or rotating the latches 202 in a range from about 30 degrees to about 120 degrees.

Figure 3:
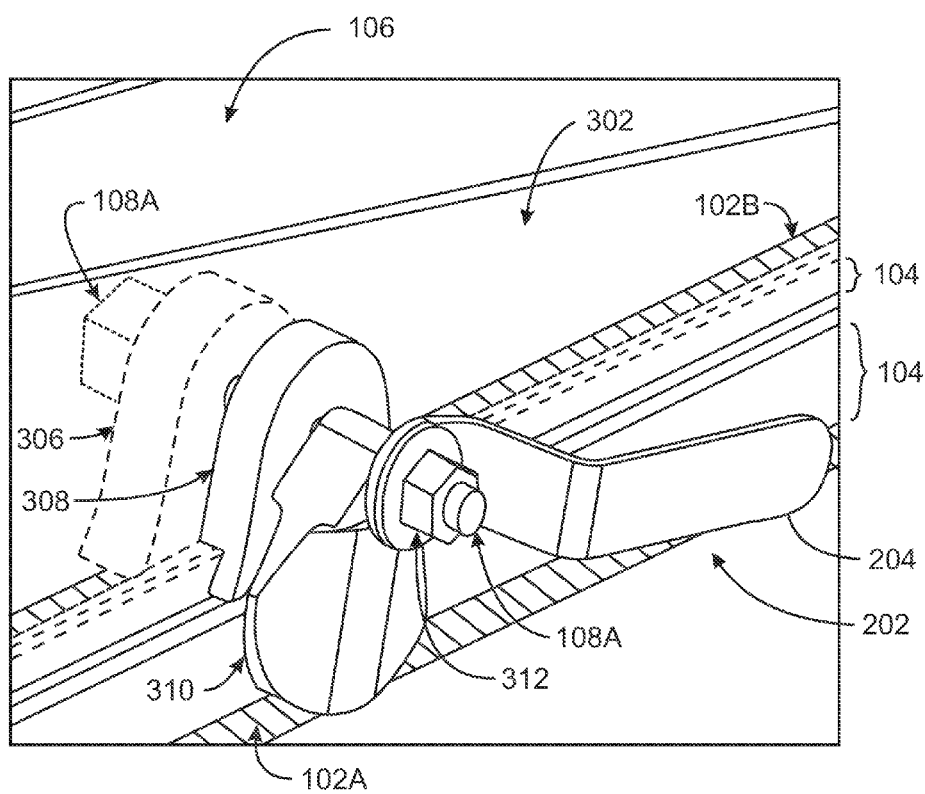
FIG. 3 is a is a front interior view of a closed latch in accordance with embodiments of the invention.

FIG. 3 is a front interior view 300 of a closed latch 202 in accordance with embodiments of the invention. In FIG. 3, the fastener 108 is shown as a bolt 108A that extends through the aperture created by the removable panel 106 and a reinforced segment 302. The portions of the latch 202 that are on the exterior of the cab are shown with dotted lines, while the portions of the latch 202 that are on the interior of the cab are shown with solid lines. Accordingly, the latch 202 includes a bolt 108A, a latch tab 306, a latch tab 308, a latch cam 310, a handle 204, and a washer 312. The exit structure 102 is shown with crosshatching on the interior of the cab at reference number 102A, and the exit structure is shown with crosshatching on the exterior of the cab at reference number 102B. The latch 202 is used to secure the removable panel 106 to the exit structure 102 of a locomotive cab, such as cab 100 (FIG.

1). The removable panel 106 may include one or more reinforced segments 302 disposed at a peripheral edge of the removable panel 106, and coupled to the frame assembly 104. The segments 302 are used to reinforce the removable panel 106 proximate to a corresponding removable panel aperture, such as the removable panel aperture through which the fasteners 108 extend (FIG. 1). The reinforced segments 302 provide further support for the removable panel 106 in areas where pressure may be applied to the removable panel 106 to keep it in place. For example, when a latch 202 is closed, the latch 202 may apply pressure to the removable panel 106. The reinforced segment 302 is able to absorb some of the additional pressure when the latch is closed in order to maintain the structural integrity of the removable panel 106.

The reinforced segment 302 may be useful in situations where a material accommodation is made in the removable panel 106. For example, a material accommodation occurs when glass or polycarbonate is used for transparency, even though another material may have more impact resistance or abrasion resistance. In embodiments where the removable panel 106 is a windshield, the reinforced segments 302 may be transparent structures, such as a thicker area of glass or a polycarbonate portion that sandwiches a glass laminate windshield. The transparent reinforced segments 302 may have relatively less transparency than the windshield and may be disposed on the peripheral edge of the windshield relative to a line of sight of an operator within the vehicle cab. The line of sight refers to the vision field of the operator in a particular direction. A suitable reinforced segment 302 may include a shatter-resistant material, a vibration resistance material, or the like. In embodiments, shatter-resistance is the ability to reduce the likelihood of breaking. For example, a shatter-resistant material may be constructed in a manner that makes it less prone to breakage. Furthermore, in the event of breakage, a shatter-resistant material is constructed in a manner to minimize the effects of the broken materials. For example, if a shatter-resistant glass does break, the resulting material crumbles into pellets of glass instead of glass shards. The pellets of glass may be less prone to harm individuals within cab when compared to glass shards.

In embodiments, the bolt 108A may be disposed on outward, corner, peripheral edges of the removable panel 106 so that the operator of the locomotive has an unobstructed view in the direction of movement of the vehicle during vehicle operation. Starting with the head of the bolt 108A on the exterior of the cab, the bolt 108A extends through the latch tab 306 on the exterior of the cab. The bolt 108A then passes through the apertures of the frame assembly 104, the removable panel 106, and the reinforced segment 302. The reinforced segments 302 can be located on either side of the removable panel 106, or the reinforced segments 302 can be integrated with the material of the removable panel 106. The bolt 108A passes through another latch tab 308 on the interior of the cab, as well as the latch cam 310. The latch tabs 306 and 308 are in contact with the frame assembly 104 and can "grab" the frame assembly 104, thus securing the removable panel 106 in place when the latch 202 is closed. The latch cam 310 provides a rocking motion to the handle 204, which is coupled to the latch cam 310 using the bolt 108A and the washer 312. In embodiments, a latch 202 may need to "draw" at least ¼ of an inch (6.35 mm) in order to compress a ¼ inch gasket, such as when a gasket or seal structure is used to assist the frame assembly 104 in connecting to the removable panel 106. Thus, the clamping mechanism of the latch 202 may need to incorporate a select amount of flex or spring to account for the draw. The clamping mechanism refers to a mechanism used to apply pressure to the latch 202, such as the latch cam 310.

Accordingly, the aperture of the frame assembly 104 provides an opening in which the entire removable panel 106 can be secured. In embodiments, the latch tab 306 and the latch tab 308 are held in place against the frame assembly 104, the removable panel 106, and the reinforced segment 302 using the pressure provided by the bolt 108A and the latch cam 310 when in a closed position, as shown in FIG. 3. When the bolt 108A passes through the latch tab 306, the removable panel 106, and the latch tab 308, the latch cam 310 and the handle 204 may be secured to the end of the bolt 108A using the washer 312. Thereby, the removable panel 106 may be fixed into position when the latch cam 310 and the handle 204 secured to the bolt 108A using the washers 312 is in a closed position. The friction of the latch cam 310 against the frame assembly 104 when the handle 204 is in a closed position provides pressure that keeps the removable panel 106 secured in place.

The handle 204 of the latch 202 may be part of a handle assembly that further comprises a coil spring or a volute spring, and at least one washer to limit gasket compression and handle operating force to account for the draw of the latch 202. In embodiments, a suitable handle assembly washer 312 is a coned-disc spring, conical spring washer, disc spring, Belleville spring, cupped spring washer, or Belleville washer. The handle assembly may include an aluminum cam on an aluminum trim piece. Such a construction may help to mitigate corrosion and provide a reduced-glare surface. Further, the latches 202 may include a coating that is a paint, powder coating, or anodized coating. The coating, where disposed on one or more mating surfaces, may help to prevent or reduce adhesion between moving parts defining the mating surfaces. Additionally, the latches 202 may have a hand clearance of equal to or greater than two inches or about 4.5 centimeters. Suitable latches 202 may have a "T" configuration or an "L" configuration. Alternatively, the latches 202 may have a knurled grip, or may be rubberized to enhance grip.

The frame assembly 104 may define one or more indents, or relatively higher friction portions, that cooperate with the latch 202. Specifically, the indents on the frame assembly 104 may cooperate with the latch cam 310. These indents may secure the latch cam 310 in defined positions along the rotation of the latch cam 310 and the handle 204. The defined positions may include an open position, a closed position, and one or more intermediate positions.

As discussed above, FIG. 3 shows the handle 204 in a closed position. In the event that the latch 202 should be opened, a person inside the cab can use the handle 204 to rotate the latch cam 310 counter-clockwise. When the handle 204 has rotated approximately one hundred and eighty degrees, the latch cam 310 will no longer be in physical contact with the frame assembly 104. When the latch cam 310 is no longer in physical contact with the frame assembly 104, clamping or pressure is no longer provided by the latch cam 310. The removable panel 106, the latch 202, and any reinforced segment 302 may then be pushed in an outward motion to allow egress from the interior of a cab, such as the locomotive cab 100. In rescue operations, the bolt 108A may be removed in order to remove the removable panel 106 from the exterior of the cab, such as the locomotive cab 100.

As noted elsewhere herein, the bolt 108A may be one of a plurality of fasteners 108, and the number of fasteners 108 is selected so as to both securely support the removable panel 106 in the frame assembly 104, and to minimize the number of fasteners 108 needed to be removed during an egress operation so as to remove the removable panel 106. Further, the number of fasteners is selected so as to support the removable panel in the frame assembly in preventing the removable panel from being removed from the frame assembly by an object, having a kinetic energy of 300 joules, that impacts on the removable panel when the fasteners are in place. An energy of 300 joules is substantially equivalent to the energy of a cinder block traveling twenty five miles per hour.

In embodiments, the exit structure 102 includes a frame assembly 104 attached to a vehicle, where the vehicle is the locomotive cab 100. The removable panel 106 may rest within the frame assembly 104 and include plural panel apertures. In embodiments, the removable panel is a windscreen. Latches 202 may be operably coupled to the removable panel 106 for releasably coupling the removable panel 106 to the frame assembly 104. Each latch 202 may include a fastener 108 extending through a respective one of the plural panel apertures, a handle 204 attached to the fastener 108 and positioned on an interior of the vehicle, an external actuator attached to the fastener and positioned on an exterior of the vehicle, and a latch cam 310 attached to the fastener. The external actuator may be a mechanism that enables operation of the fastener 108. For example, when the fastener is a bolt, the actuator may be the head of the bolt. In a first position of the handle 204, the latch cam 310 is positioned to abut the frame assembly 104 for keeping the removable panel 106 in place against the frame assembly 104. In a second position of the handle 204, the latch cam 310 is removed from abutting the frame assembly 104, thereby enabling the removable panel 106 to be released from the frame assembly 104. The actuator is configured for actuation of the latch cam 310 from the exterior of the vehicle for moving the latch cam 310 from the first position to the second position for releasing the panel from the frame assembly.

Figure 4:
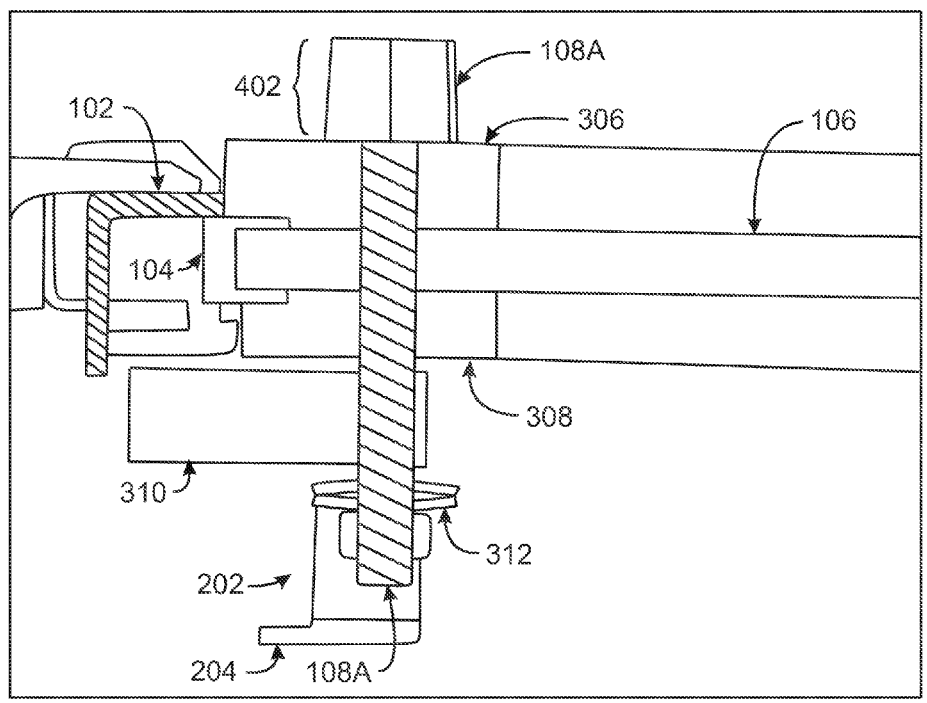
FIG. 4 is a side view of a latch in accordance with embodiments of the invention.

FIG. 4 is a side view of a latch 300 in accordance with embodiments of the invention. As described above, the fastener is shown as a bolt 108A that extends throughout the latch assembly 202 and couples the latch tab 306, removable panel 106, the latch tab 308, the latch cam 310, the washer 312 and the handle 204 together.

In embodiments where the removable 106 panel is a windshield, the removable panel 106 may be designed and selected so as to prevent the passing of an object having a specified mass, size, and shape traveling at a specified minimum velocity therethrough (such as the aforementioned typical cinder block traveling at 25 kph, which would have a kinetic energy of around 300 joules). The frame assembly 104 may then be correspondingly designed to support the removable panel 106 during impact of the object and further to subsequently release the panel during an egress operation after such an impact. Where the vehicle is a locomotive, the panel may be designed to comply with strength requirements of the appropriate federal regulations (e.g., 49 C.F.R. §223). Suitable safety regulations, standards and policies may exist for airplanes, marine vessels, mining equipment, and on-road vehicles.

The fastener such as bolt 108A may have an outward end that is accessible from outside of the enclosed space, such as the vehicle cab. The bolt 108A is accessible from the exterior of the locomotive cab using the head 402 of the bolt 108A. The bolt 108A may function to reduce or prevent ingress/egress through the exit except during selected events (such as an emergency escape). Thus, there may be a need to allow access, but prevent unauthorized access or trespassing. The outward facing head 402 of the bolt 108A should be engageable by appropriate responders, such as emergency first responders, but not by trespassers. Further, during an emergency situation there may be a desire for a speedy release. The release tools may need to be tailored to address practical and sometimes conflicting realities of security and emergency.

In one embodiment, the fastener such as the bolt 108A has a pentagonal head. Alternatively, the head may be square, hex, or duodecimal (e.g., 12-pointed or star). In another embodiment, the fasteners 108 may be part of a rapid entry system. In a rapid entry system, a master key is kept by emergency responders, and that master key opens a proximately located box that contains the tool that engages (and releases) the fastener.

The pentagonal head may interface with a fire hydrant wrench such as may be carried by first responders in the United States. Such a wrench may be tapered or non-tapered. In embodiments, the pentagonal head is designed for release by the most widely used number of such wrenches. Optionally, the fastener may include a rotatable tamper resistant collar. In order to be tamper resistant, a collar is designed in a manner that discourages opening, release, or removal of the fastener without proper tools. In examples, the collar may encircle a portion of the fastener, such as the head of the fastener. Further, when a tamper resistant collar is rotatable, the collar may encircle a portion of the fastener and can rotate around the portion of the fastener. The rotatable tamper resistant collar may be secured around a portion of the fastener using a tightening screw. In embodiments, the fastener may be one of a group of fasteners numbering from about two to about twenty fasteners (e.g., two to twenty fasteners).

Figure 5:
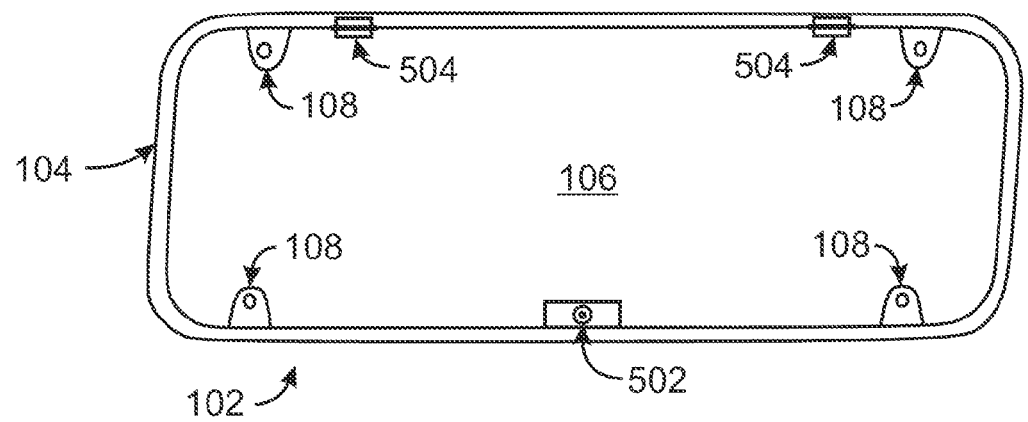
FIG. 5 is a front exterior view of an exit structure with a center lug and hinges according to embodiments of the invention.

FIG. 5 is a front exterior view 500 of an exit structure 102 with a center lug 502 and hinges 504 according to embodiments of the invention. The exit structure 102 is a component of the locomotive cab 100, as shown in FIG. 1. In embodiments, there may be one fastener 108 for each side of a four-sided panel, two fasteners 108 on opposing sides of the panel, or some other configuration. FIG. 5 shows two fasteners 108 on opposing sides of the removable panel. The location of the fasteners 108 in FIG. 5 is equally offset relative to a center lug. The center lug can include a method for release from the interior of the cab, and is used to prevent the removable panel 106 from inadvertently dislodging from the exit structure 102. By equally offsetting the fasteners 108 relative to the position of the center lug 502, the center lug 502 is able to provide substantially equal support to any fastener 108 that is inadvertently loosened.

In addition to the fasteners 108, there may be one or more hinges 504 that can cooperate with the fastener to secure the removable panel 106 to the frame assembly 104. Although the hinges 504 are shown on the upper exterior of the exit structure 102, the hinges may be located on the interior of the locomotive cab 100 (FIG. 1), and the hinges may be located on any edge of the exit structure. The hinges 504 may be separable upon rotation around a hinge pin. Optionally, the hinge pin may be removable. During an egress operation, one or more fasteners 108 may be engaged by a hydrant wrench on one side of the removable panel 106 for removal, and then the removable panel 106 may be pulled up at hinges 504 on the other side of the panel, and the segments of the hinges 504 may disengage to fully release the panel from the frame.

Furthermore, in embodiments, the exit structure 102 may be secured to a locomotive cab 100 having a removable panel heater. Thus, the exit structure 102 may be part of a system that further includes a heater wire harness for supplying power to the removable panel heater. The removable panel heater may also be disposed relative to a center lug. The wire harness can couple to a panel heater in the removable panel 106 to supply power thereto. The heater wire harness may have a disconnect assembly (e.g., disconnect assembly that can be actuated for disconnection one handed and/or simply by pulling) and sufficient slack so as to reduce or prevent impedance to removing the removable panel 106 during an egress operation. The frame assembly 104, the removable panel 106, or both, may have a sharpened and/or serrated edge proximate to the wire harness. The sharp edge may facilitate cutting the wire harness during an egress operation.

Figure 6:
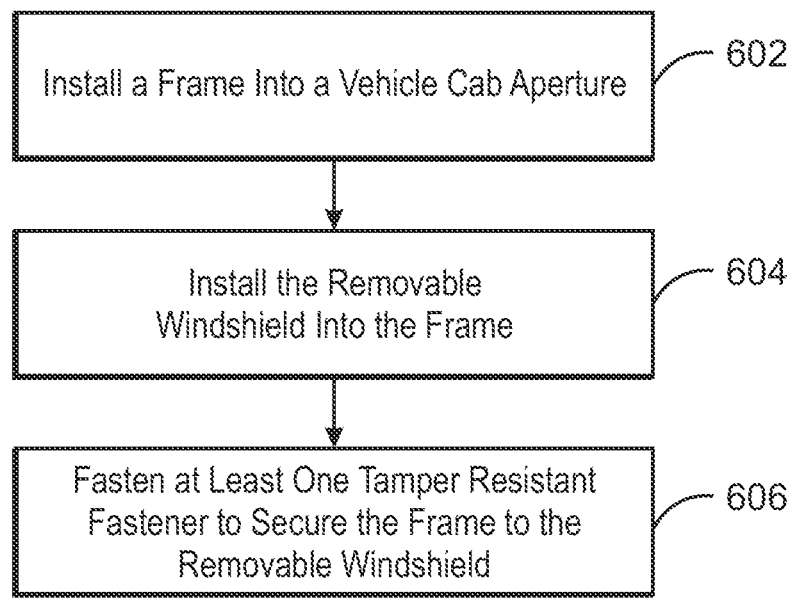
FIG. 6 is a flow diagram that describes a method for installing a removable panel in accordance with embodiments of the invention.

FIG. 6 is a flow diagram that describes a method 600 for installing a removable panel in accordance with embodiments of the invention. At block 602, a frame is installed into a vehicle cab aperture designed to house a non-removable windshield. The frame may be a frame assembly such as frame assembly 104. The frame may be configured to receive a removable panel. At block 604, a removable panel may be installed into the frame. The removable panel may be a windshield. At block 606, at least one tamper resistant fastener is fastened to secure the frame to the removable panel. The fastener may be a bolt 108A (FIG. 3) as described above.

Figure 7:
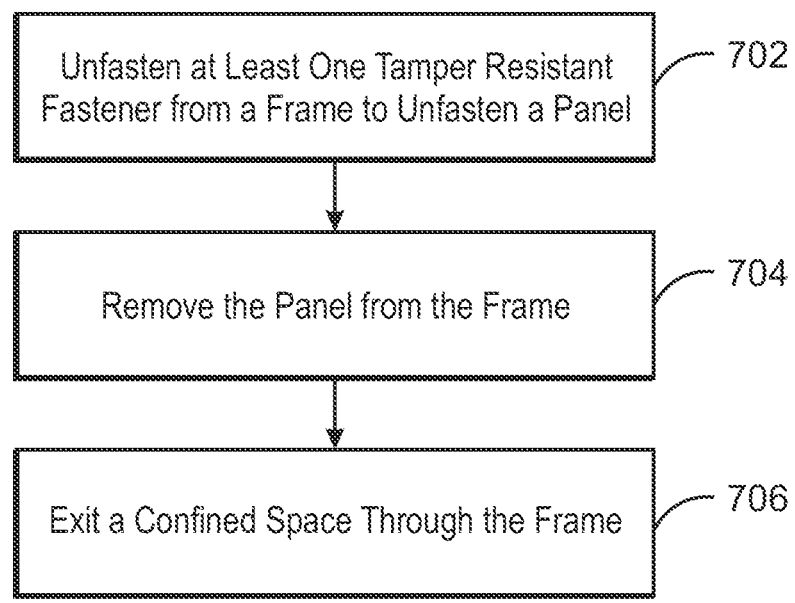
FIG. 7 is a flow diagram that describes a method for egress in accordance with embodiments of the invention.

FIG. 7 is a flow diagram that describes a method 700 for egress in accordance with embodiments of the invention. At block 702, at least one tamper resistant fastener is unfastened from a frame in order to unfasten a panel such as a removable panel. The tamper resistant fastener may be unfastened using a handle on the interior of a cab, or the tamper resistant fastener can be unfastened from the exterior of the cab using tools as described above. At block 704, the panel is removed from the frame. At block 706, a confined space is exited through the frame.

Another embodiment relates to an exit structure comprising a frame assembly defining at least one frame aperture, a removable panel configured to secure to the frame assembly and defining at least one removable panel aperture configured to align with the frame aperture, and at least one fastener that is configured to extend through a corresponding one of the removable panel aperture and the frame aperture and to thereby removably couple the panel to the frame assembly. The at least one fastener includes an integral or a releasable operating handle.

In another embodiment of the exit structure, the operating handle is configured to reside inside a vehicle cab.

In another embodiment of the exit structure, the operating handle is configured to release the at least one fastener, and thus the removable panel, with a swing of the operating handle that is in a range of from about 30 degrees to about 120 degrees.

In another embodiment of the exit structure, the operating handle is part of a handle assembly that further comprises a coil spring or a volute spring, and at least one washer to limit gasket compression and handle operating force.

In another embodiment of the exit structure, the handle assembly washer is a Belleville washer.

In another embodiment of the exit structure, the handle assembly comprises an aluminum cam on aluminum trim piece to mitigate corrosion and provide a reduced-glare surface.

In another embodiment of the exit structure, the operating handle comprises a coating that is paint, powder coating, or anodized coating.

In another embodiment of the exit structure, the coating, where disposed on one or more mating surfaces, is configured to prevent or reduce adhesion between moving parts defining the mating surfaces.

In another embodiment of the exit structure, the operating handle is configured with a hand clearance of equal to or greater than 4.5 centimeters.

In another embodiment of the exit structure, the frame defines indents or relatively higher friction portions that are configured to cooperate with the one or more operating handles and thereby to secure the one or more operating handles in defined positions, and the defined positions include an open position, a closed position, and one or more intermediate positions.

In another embodiment of the exit structure, the operating handles have a "T" configuration or an "L" configuration.

The above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those having ordinary skill in the art upon reviewing the above description. The scope of the invention should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112, sixth paragraph, unless and until such clause limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the clauses, and may include other examples that occur to those of ordinary skill in the art. Such other examples are intended to be within the scope of the clauses having structural elements that do not differ from the literal language of the clauses, or if they include equivalent structural elements with insubstantial differences from the literal languages of the clauses.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The invention claimed is:

1. An exit structure, comprising:
a frame assembly defining at least one frame aperture;
a removable panel configured to secure to the frame assembly and defining at least one removable panel aperture configured to align within the frame aperture; and
at least one fastener that is configured to extend through a corresponding one of the removable panel aperture and the frame aperture and to thereby removably couple the panel to the frame assembly;

wherein the at least one fastener is one of a plurality of fasteners, and the number of fasteners is selected so as to support the removable panel in the frame assembly for preventing the removable panel from being removed from the frame assembly by an object with a kinetic energy of 300 joules impacting on the removable panel when the fasteners are in place.

2. The exit structure of claim 1, wherein the frame assembly is configured to retroactively fit to a vehicle cab windshield frame that is configured to accept a non-removable windshield and using a gasket or other seal structure.

3. The exit structure of claim 1, wherein the frame assembly comprises a seal structure.

4. The exit structure of clause 3, wherein the seal structure comprises at least one of a neoprene foam, a silicon foam, or a zip strip or tear wire.

5. The exit structure of claim 1, wherein the removable panel is a windshield.

6. The exit structure of claim 1, wherein the removable panel comprises one or more reinforced segments disposed at a peripheral edge of the removable panel, and each segment reinforces the removable panel proximate to a corresponding one of the at least one removable panel aperture.

7. The exit structure of claim 6, wherein the reinforced segments are transparent structures that comprise a shatter-resistant material.

8. The exit structure of claim 6, wherein the reinforced segments are disposed on the peripheral edge relative to a line of sight of an operator in a vehicle cab, wherein the line of sight is between an operator and a vehicle route during vehicle operation.

9. The exit structure of claim 1, wherein the at least one fastener has a pentagonal head, and is configured to interface with a fire hydrant wrench.

10. The exit structure of claim 1, further comprising one or more hinges configured to cooperate with the at least one fastener to secure the removable panel to the frame assembly.

11. The exit structure of claim 10, wherein the one or more the hinges are separable upon rotation around respective one or more hinge pins.

12. The exit structure of claim 11, wherein the one or more hinge pins are removable.

13. The exit structure of claim 1, wherein the at least one fastener is offset relative to a centrally located lug.

14. The exit structure of claim 1, wherein the exit structure is secured to a vehicle cab having a wiper operable to wipe the removable panel, and the at least one fastener is disposed at a location on the removable panel so that operation of the wiper does not contact the fastener.

15. The exit structure of claim 14, wherein the wiper is configured to allow removal of the removable panel during an egress operation.

16. The exit structure of claim 1, wherein the at least one fastener includes an integral or a releasable operating handle.

17. The exit structure as defined in claim 1 wherein the frame assembly is a retrofit kit configured to engage an existing, empty window frame in a vehicle.

18. A method, comprising:
installing a frame into a vehicle cab aperture designed to house a non-removable windshield, wherein the frame is configured to receive a removable windshield;
installing the removable windshield into the frame; and
fastening at least one tamper resistant fastener to secure the frame to the removable windshield;
wherein the at least one fastener comprises plural fasteners, and the number of fasteners is selected so as to support the removable windshield in the frame for preventing the removable windshield from being removed from the frame by an object with a kinetic energy of 300 joules impacting on the removable windshield when the fasteners are in place.

19. An exit structure, comprising:
a frame assembly attached to a vehicle;
a removable panel resting in the frame assembly and defining plural panel apertures, wherein the removable panel comprises a windscreen; and
latches operably coupled to the panel for releasably coupling the panel to the frame assembly, wherein each latch comprises a fastener extending through a respective one of the plural panel apertures, a handle attached to the fastener and positioned on an interior of the vehicle, an external actuator attached to the fastener and positioned on an exterior of the vehicle, and a cam attached to the fastener, wherein in a first position of the handle the cam is positioned to abut the frame assembly for keeping the panel in place against the frame assembly, and wherein in a second position of the handle the cam is removed from abutting the frame assembly for allowing the panel to be released from the frame assembly, and wherein the actuator is configured for actuation of the cam from the exterior of the vehicle for moving the cam from the first position to the second position for releasing the panel from the frame assembly;
wherein the number of fasteners is selected so as to support the removable panel in the frame assembly for preventing the removable panel from being removed from the frame assembly by an object with a kinetic energy of 300 joules impacting on the removable panel when the fasteners are in place.

* * * * *

UNITED STATES PATENT AND TRADEMARK OFFICE
CERTIFICATE OF CORRECTION

PATENT NO. : 8,899,654 B2  Page 1 of 1
APPLICATION NO. : 13/633609
DATED : December 2, 2014
INVENTOR(S) : Ellsworth et al.

It is certified that error appears in the above-identified patent and that said Letters Patent is hereby corrected as shown below:

In the Specification

In Column 4, Line 37, delete "handle 202." and insert -- handle 204. --, therefor.

In Column 4, Line 46, delete "handle 202," and insert -- handle 204, --, therefor.

In Column 4, Line 48, delete "handle 202" and insert -- handle 204 --, therefor.

In the Claims

In Column 11, Line 14, in Claim 4, delete "clause" and insert -- claim --, therefor.

Signed and Sealed this
Twenty-sixth Day of May, 2015

Michelle K. Lee
*Director of the United States Patent and Trademark Office*